UNITED STATES PATENT OFFICE.

GUSTAV MARTELL, OF GLAUCHAU, GERMANY.

PHOSPHOROUS COMPOUND AND METHOD OF MAKING SAME.

No. 820,587.     Specification of Letters Patent.     Patented May 15, 1906.

Application filed March 10, 1905. Serial No. 249,495.

*To all whom it may concern:*

Be it known that I, GUSTAV MARTELL, physician, a subject of the German Emperor, and a resident of Glauchau, in the Kingdom of Saxony, German Empire, have invented certain new and useful Improvements in Preparations of Organic Phosphorous Compounds, of which the following is a specification.

Owing to the loss of animal phosphorus, nervous disorders, neurasthenia, and their consequent conditions are caused in the human organism, and for this reason the latter must be supplied with animal phosphorus, such as cannot be replaced by the phosphates which are found in the yolk of eggs and in vegetable matter or by those of inorganic origin.

My invention relates to a preparation of organic phosphorus obtained from the spinal cord—viz., from the prolonged marrow known as the "*Medulla oblongata,*" the upper cervical enlargement of the spinal cord, or *Bulbus cervicalis,* and the lower cervical enlargement or *Bulbus lumbalis,* and from the frontal and the temporal brain of strong healthy four to five year old cattle. It is in the regions here mentioned that the largest accumulations of phosphorus are to be found.

My new preparation is best manufactured as follows: The parts stated of the spinal cord and brain are deprived of their skin or membrane, washed with physiological common-salt solution, comminuted and stirred up to form a paste with the spirit of ether, known as "*spir. aether*" of the *Pharmacopoeia Germanica* and consisting of one part to three parts spirit of specific gravity 0.805 to 0.809, which should be added gradually. Spirit of ether of the kind referred to is next added to this paste, which is then left a sufficient time in order to effect extraction, the whole being well shaken during the process. The entire mass is then filtered and the residue remaining on the filter still further pressed. The filtrate thus obtained is an extract of the substance of the brain and spinal cord. The ether contained in it can now be slowly evaporated over a water-bath or sand-bath at a temperature of, at most, 40° centigrade until a yellowish residue remains. To this residue a certain proportion of blood-serum, spermin, and phosphate of sodium is added under constant agitation until the entire mass has hardened. The proportions I prefer to use are substantially: residue, thirty grams; blood-serum, sixty grams; spermin, five grams; phosphate of sodium, five grams. The thus hardened mass is ground to a powder and is extremely rich in phosphorus.

By using this preparation as basis, mixed in certain proportion with glycerin sodium phosphate, spermin, amylum, &c., pills, ointments, and the like may be manufactured.

The new preparation is, in the first place, a substitutional preparation, inasmuch as it affords a substitute for the phosphorus of the nervous system gradually being consumed in consequence of vital activity. It is furthermore an antitoxic preparation, since it forms the natural physiological antitoxin for the very numerous toxins of metabolism, which form, owing to nervous exhaustion, and are classed together generally as leucomaines. These toxins the new preparation by neutralization renders inactive.

What I claim is—

1. The process of manufacturing a preparation of organic phosphorus, consisting in removing the skin from the marrow and brain of cattle, washing this marrow and brain in a solution of common salt, comminuting them, stirring them to a pasty condition with the spirit of ether, known as "*spir. aether*" of the *Pharmacopoeia Germanica,* forming an extraction thereof with spirit of ether of the said kind, filtering the mass, driving off the ether from the filtrate, and mingling the product with blood-serum, spermin, and phosphate of sodium, until the mass has hardened and is in a readily-pulverizable condition, all substantially as described.

2. The herein-described organic phosphorous compound, consisting of a dry, readily-pulverizable mass obtained from mingled marrow and brain of cattle, blood-serum, spermin, and sodium phosphate, substantially as described.

In witness whereof I have hereunto signed my name, this 26th day of January, 1905, in the presence of two subscribing witnesses.

GUSTAV MARTELL.

Witnesses:
   A. SCHRAMM,
   M. L. CREEVEY.